(12) United States Patent
Erben

(10) Patent No.: US 6,352,003 B1
(45) Date of Patent: Mar. 5, 2002

(54) COMBINATION INSTRUMENT

(75) Inventor: Thomas Erben, Eichberg (CH)

(73) Assignee: Mannesmann VDO AG, Frankfurt (DE)

( * ) Notice: Subject to any disclaimer, the term of this patent is extended or adjusted under 35 U.S.C. 154(b) by 0 days.

(21) Appl. No.: 09/364,405

(22) Filed: Jul. 30, 1999

(30) Foreign Application Priority Data

Aug. 5, 1998 (DE) .......................................... 198 35 215

(51) Int. Cl.⁷ ................................................. H05K 5/00
(52) U.S. Cl. ...................................................... 73/866.3
(58) Field of Search ............................... 73/431, 866.3, 73/498; D10/122, 124; D12/192; 116/305; 248/27.1, 27.3

(56) References Cited

U.S. PATENT DOCUMENTS

| | | | |
|---|---|---|---|
| 4,322,835 A | * | 3/1982 | Ernst et al. .................... 73/431 |
| 4,948,074 A | * | 8/1990 | Bramhall, Jr. ............... 73/431 |
| 5,062,604 A | * | 11/1991 | Monnier |
| 5,430,612 A | * | 7/1995 | Simon et al. |
| 5,959,844 A | * | 9/1999 | Simon et al. .............. 73/866.3 |

FOREIGN PATENT DOCUMENTS

| | | |
|---|---|---|
| DE | 2720764 | 11/1978 |
| DE | 4318011 | 12/1994 |
| DE | 29617813 | 11/1996 |
| DE | 19537233 | 4/1997 |
| FR | 2497996 | 7/1982 |

\* cited by examiner

*Primary Examiner*—Robert Raevis
(74) *Attorney, Agent, or Firm*—Martin A. Farber

(57) ABSTRACT

A combination instrument (1) has an instrument carrier which is designed as a tubular, transparent hollow body (2) which is closed off at its ends by means of two side parts (3, 4). A plurality of display instruments (6, 7, 8, 9) arranged on a common circuit board (5) can in this way be inserted without difficulty into the hollow body (2). The combination instrument (1) is in this way optimally protected against environmental influences while at the same time allowing simple adaptation to different applications by cutting the hollow body (2) to length.

3 Claims, 4 Drawing Sheets

Fig. 4

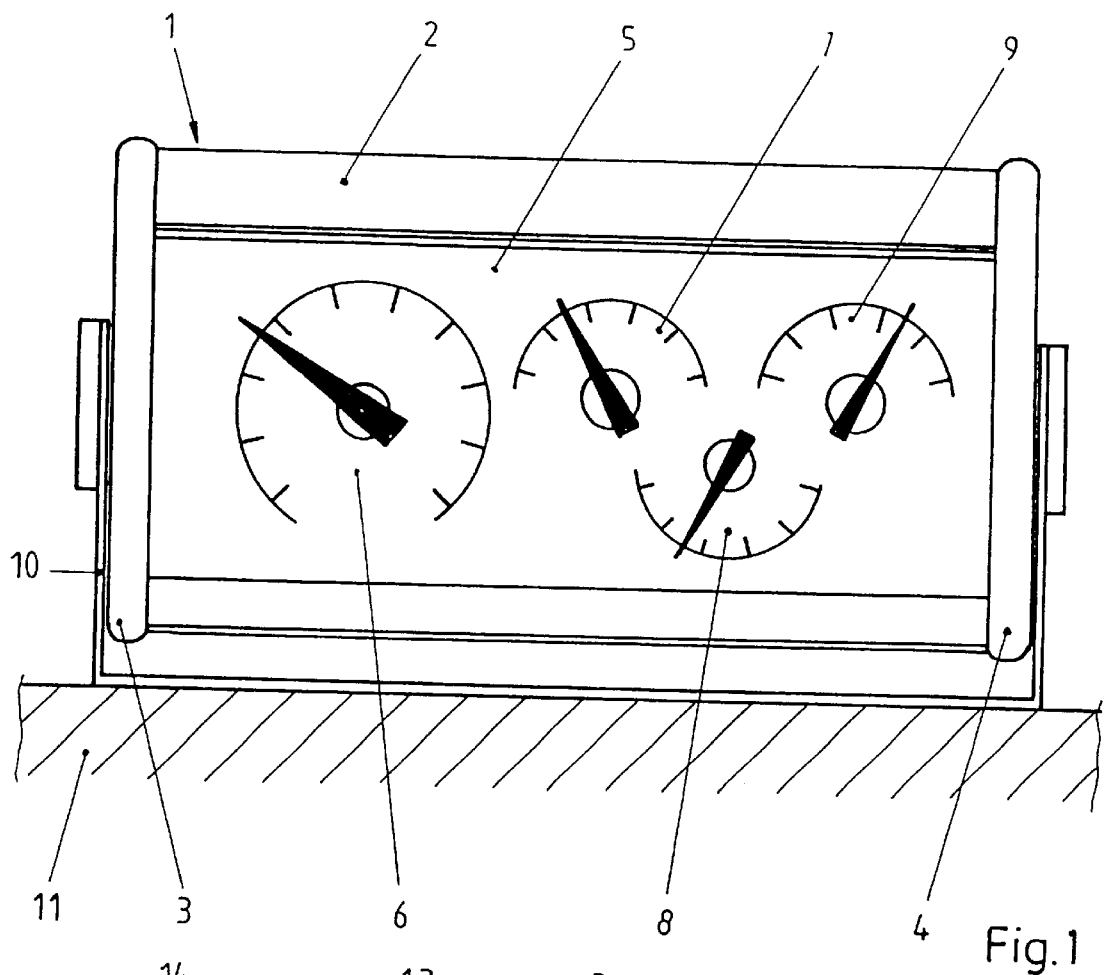
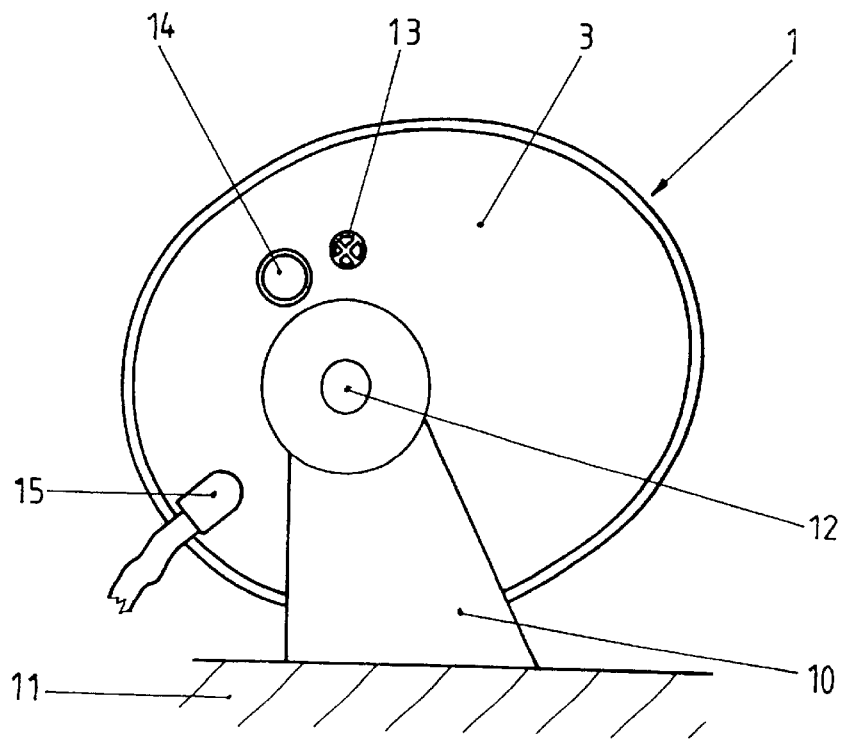

COMBINATION INSTRUMENT

FIELD AND BACKGROUND OF THE INVENTION

The invention relates to a combination instrument, in particular for a watercraft, having an instrument carrier for holding a plurality of display instruments.

Nowadays, combination instruments of the type mentioned are used in many different land vehicles and watercraft, for example including in yachts, but also in stationary machines for example, generators. An instrument carrier, which is usually in the form of a box, in this case accommodates a plurality of display instruments which are sealed in order to protect against penetration of moisture and dust particles. The instrument carrier is often arranged pivotably at a suitable position in the cockpit by means of a support bracket, so that the read-out angle can be individually adapted to the requirements of the user. The display instruments may be inserted into the instrument carrier both from the front and from the rear. The instrument carrier is also suitable for further display instruments to be retrofitted.

A drawback of the combination instrument described is that the display instruments, which are inserted in suitable recesses, have to be carefully sealed with respect to the instrument carrier, since otherwise it is easy for moisture to penetrate into the combination instrument, which may lead to damage to the display instruments.

Consideration has already been given to providing the instrument carrier with a cover plate, in order in this way to achieve an effective seal. A drawback of this solution is that in this arrangement either the display instruments have to be inserted into the housing from the rear side of the instrument carrier, or the covering plate has to be releasably connected to the instrument carrier. In this case, the outlay which is required in order to seal the instrument carrier increases as the size of the combination instrument rises, so that a multipart cover plate is required for large embodiments. This reduces the attractiveness of its appearance. Furthermore, the freedom available to the designer is considerably limited by the essentially flat cover plate, so that it is scarcely possible for the design to differ.

SUMMARY OF THE INVENTION

The invention is based on the problem of providing a combination instrument of the type mentioned in such a way that the instrument carrier is designed so as to be particularly well protected against the penetration of environmental influences. At the same time, it is intended that it be easy to mount the display instruments in the instrument carrier.

According to the invention, this problem is solved wherein the fact wherein the instrument carrier has a hollow body which is transparent at least in sections and in its interior accommodates the display instruments in such a way that the displays of the display instruments are visible to an observer through the hollow body.

This formation allows the display instruments to be arranged in the interior of the hollow body, which is closed on all sides with the exception of an installation opening, without a special seal being required. The display instruments can be read without difficulty as a result of their arrangement in the transparent hollow body; if the hollow body is transparent only in sections, the displays on the display instruments can be seen and read through these sections. It is possible to produce corresponding hollow bodies in virtually any desired sizes and shapes and to adapt them individually for different applications. For example, it is possible to use acrylic plastic hollow bodies as long sections which then merely have to be cut to the desired length. Due to the simple design of the novel instrument which is sealed from environmental influences, this instrument can be used to good effect not only in watercraft and road vehicles but also in stationary machines and installations, such as for example generators.

The display instruments may, for example, be introduced into the interior of the hollow body through a rear-side installation opening. However, an embodiment of the invention in which the hollow body is tubular and the ends of the hollow body are each closed off by means of a side part is particularly advantageous. As a result, the display instruments can be introduced without difficulty through the initially unclosed ends of the hollow body and can be fixed inside the hollow body. Then, it is merely necessary to attach each of the side parts. In this case, it is also conceivable for the hollow body to be joined to one of the side parts so as to form a single component. The instruments are introduced into such a pot-like hollow body from its open side, which is then closed off by means of the second side part.

That section of the hollow body which is located in the area of the rear side of the display instruments may have a covering or coating, in order to make it impossible to see the components of the display instruments. However, an embodiment of the invention in which the hollow body has a transparent section which is directed toward the front side of the display instruments and an opaque section which is directed toward the rear side of the display instruments is particularly advantageous. This provides simple yet effective protection from being able to see components situated on the rear. This additionally prevents extraneous light from impinging at the rear of the display instruments, thus improving the reading accuracy especially in darkness and in the case of back-lit display instruments. At the same time, the area surrounding the combination instrument is shielded from light radiation from the display instruments emerging diffusely from the hollow body, an effect which is often found to be distracting.

To this end, the hollow body could, for example, be composed of a transparent half shell and a nontransparent half shell. However, it is particularly advantageous if the hollow body is produced using the two-component injection-molding process and has a first, transparent area and a second, nontransparent area. In this way, it is possible, with a single-piece hollow body, to produce both an essentially transparent area and an essentially nontransparent area. The assembly outlay is consequently relatively low.

On its inside, the hollow body may have a receiving compartment for the display instruments. An embodiment of the invention in which the side parts have a fixing means for the display instruments is particularly advantageous. In this way, the display instruments can be fixed inside the hollow body with only a low level of outlay. To this end, the display instruments may, for example, initially be connected to the side part and then introduced as a unit into the hollow body. This eliminates the outlay which results in known combination instruments from mounting work inside the instrument carrier. At the same time, the display instruments are fixed in place as a result of the arrangement of the fixing means on the side parts and independently of the hollow body, which consequently can be procured as a standard component and cut to length as required.

It is particularly expedient in this connection if the fixing means is designed to plug in a circuit board which is common to the display instruments. Such a plug-together connection allows the circuit board to be fixed in the holder, which is designed for example as a groove, without additional attachment means and special tools. As a result, the display instruments, together with their common circuit board, can be removed from the holder in one action; the holder may at the same time also, for example, be provided with the electrical contact means which are required. As a result, it is possible to exchange the display instruments as a single unit or for the desired additional display instruments to be retrofitted outside the hollow body, with the result that these display instruments can be adapted optimally and so as to provide a professional visual appearance.

The side parts may be connected to the hollow body by means of a screw connection, for example. On the other hand, a refinement of the invention in which the hollow body is fixed between the two side parts which are stressed toward one another is particularly advantageous. As a result, there is no need for any attachment means whatsoever to be provided on the hollow body, so that the hollow body can be adapted particularly easily. To this end, the two side parts which face toward one another are connected to one another, for example by means of a screw connection. The side parts may additionally have a guide, for example a groove, which prevents the hollow body from slipping transversely with respect to the fixing direction.

It is particularly expedient if the display instruments in the hollow body are fixed with play with respect to the side parts. This makes it possible to prevent the functioning of the display instruments from being impaired by excessive, damaging mounting forces. A particularly suitable solution consists in mounting the display instruments with sufficient tolerance with respect to the side parts, and also fixing them by means of elastic fixing means.

It is also expedient if the side parts are sealed with respect to the hollow body by means of a seal. In this way, it is possible, in a simple manner, to considerably improve the sealing, so that the resultant combination instrument is suitable even for applications in which it is highly exposed to environmental influences.

In a particularly advantageous embodiment of the invention, at least one side part has a cutout for making electrical contact. As a result, the hollow body may be designed without openings, thus further improving protection of the hollow body against environmental influences. The electrical contact may, for example, also be arranged integrated into a bearing bracket, so that it is not visible from the outside. Also, switching elements or plug contacts may be arranged in the side parts. The ability of the hollow body to pivot remains unimpaired. Moreover, the hollow body can in this case be exchanged without problems.

In a particularly advantageous embodiment of the invention, the hollow body is arranged in a dashboard in such a manner that it can pivot from an operating position, in which the display instruments are visible to an observer, into an at-rest position, in which the display instruments are covered by the dashboard. As a result, the combination instrument, after it has been used, can be pivoted into an at-rest position, so that it is protected in the dashboard against damage and environmental influences. For this purpose, the instrument carrier may be mounted so that it can rotate sideways. In the case of essentially circular instrument carriers, the dashboard may to this end surround more than half the circumference of the instrument carrier, making it easy to rotate. At the same time, the contacts can be located inside the dashboard, in such a manner that they are invisible to an observer. It is also possible to arrange a lock mechanism on the instrument carrier, preventing unauthorized pivoting and, at the same time, providing good antitheft protection.

Another particularly practical embodiment of the invention is achieved by means of a cover which can move relative to the hollow body, in order to provide protection against the incidence of extraneous light and damage. The cover covers an adjustable partial area of the hollow body, in particular of the transparent area covering the display instruments, thus allowing simple and effective protection against, for example, solar radiation. To this end, the cover may be pivotable about a pin arranged on the combination instrument.

On the other hand, it is particularly expedient if the cover is displaceable in a guide of the respective side part. In this way, it is possible to achieve a design of the cover which is both effective and space-saving. In this case, the cover is moved in the side-part guide, which is designed, for example, as a groove, in a similar manner to a roller shutter. For this purpose, the side parts may also have a cross-sectional area which differs from that of the hollow body, so that the cover can be displaced in a guide which is arranged at a distance from the hollow body. Furthermore, the position of the cover relative to the hollow body is not changed by a possible pivoting movement, allowing simple operation.

BRIEF DESCRIPTION OF THE DRAWINGS

Various embodiments of the invention are possible. In order to further explain the basic principle of the invention, three of these embodiments are illustrated in the drawings and described below. In the figures, corresponding components are provided with identical reference numerals. In the drawings:

FIG. 1 shows a front view of a combination instrument according to t he invention, FIG. 2 shows a side view of the combination instrument.

DETAILED DESCRIPTION OF THE PREFERRED EMBODIMENTS

Figure 3:
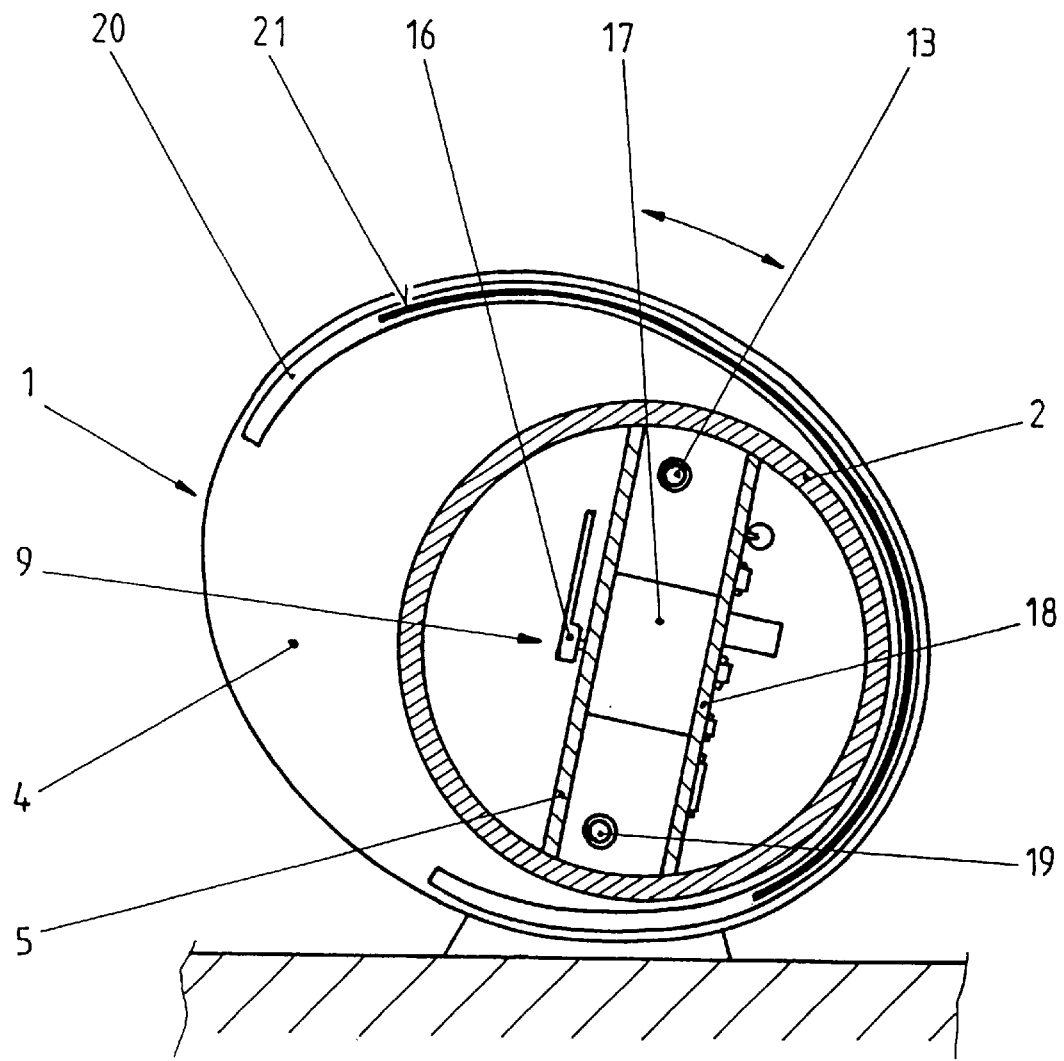
FIG. 3 shows a sectional side view of the combination instrument.

FIG. 1 shows a front view of a combination instrument 1 according to the invention. The combination instrument 1 has a transparent, tubular hollow body 2, the ends of which are each closed off by a side part 3, 4. Through the hollow body 2, which is of essentially transparent design, a plurality of display instruments 6, 7, 8, 9, which are attach ed in its interior to a common circuit board 5, are arranged so that they can be seen from the outside. By means of a bearing bracket 10, the side parts 3, 4 are connected to a section of a dashboard 11, which is illustrated only by way of example, in such a way that the hollow body 2 is arranged s o that it can pivot about its longitudinal axis.

FIG. 2 shows a side view of the combination instrument 1. The figure illustrates the side part 3, which is connected to the dashboard 11 by means of the bearing bracket 10. The combination instrument 1 is mounted so that it can pivot about a pivot pin 12, making it possible to set an individual read-out angle which is comfortable for the particular observer. The side part 3 is screwed to the opposite side part 4, which is illustrated in FIG. 1, by means of a screw 13. The side part 3 furthermore has a switch element 14 which can be used, for example, to actuate a reset mechanism for an odometer or an operating-hours counter. Furthermore, the side part 3 is provided with an electrical contact means 15 which is arranged outside the field of view of an observer.

FIG. 3 shows a sectional side view of the combination instrument 1. In its interior, the essentially circular hollow body 2 accommodates the display instrument 9, the pointer tab 16 of which can be moved by means of a pointer drive 17 arranged on the rear side of the common circuit board 5. In a rear area of the hollow body 2, which is not visible to the observer, there is a further circuit board 18 which bears the control elements of the pointer instrument. The circuit boards 5, 18 are each arranged in a guide (not shown) in the side parts 3, 4. For mounting purposes, the circuit boards 5, 18 are initially connected to the side part 4. Then, the hollow body 2 is fitted over the circuit boards 5, 18, and finally, the second side part (not shown) is stressed toward the first side part 3, which is illustrated in FIG. 1, by means of the screw 13 and a further screw 19. Before this, a cover 21, which can be displaced in the area of the guide 20, is inserted into a guide 20 which is arranged in the peripheral area of the side parts 3, 4. This cover 21 is used to protect the combination instrument 1 from environmental influences, for example solar radiation, and from mechanical damage.

Figure 4:
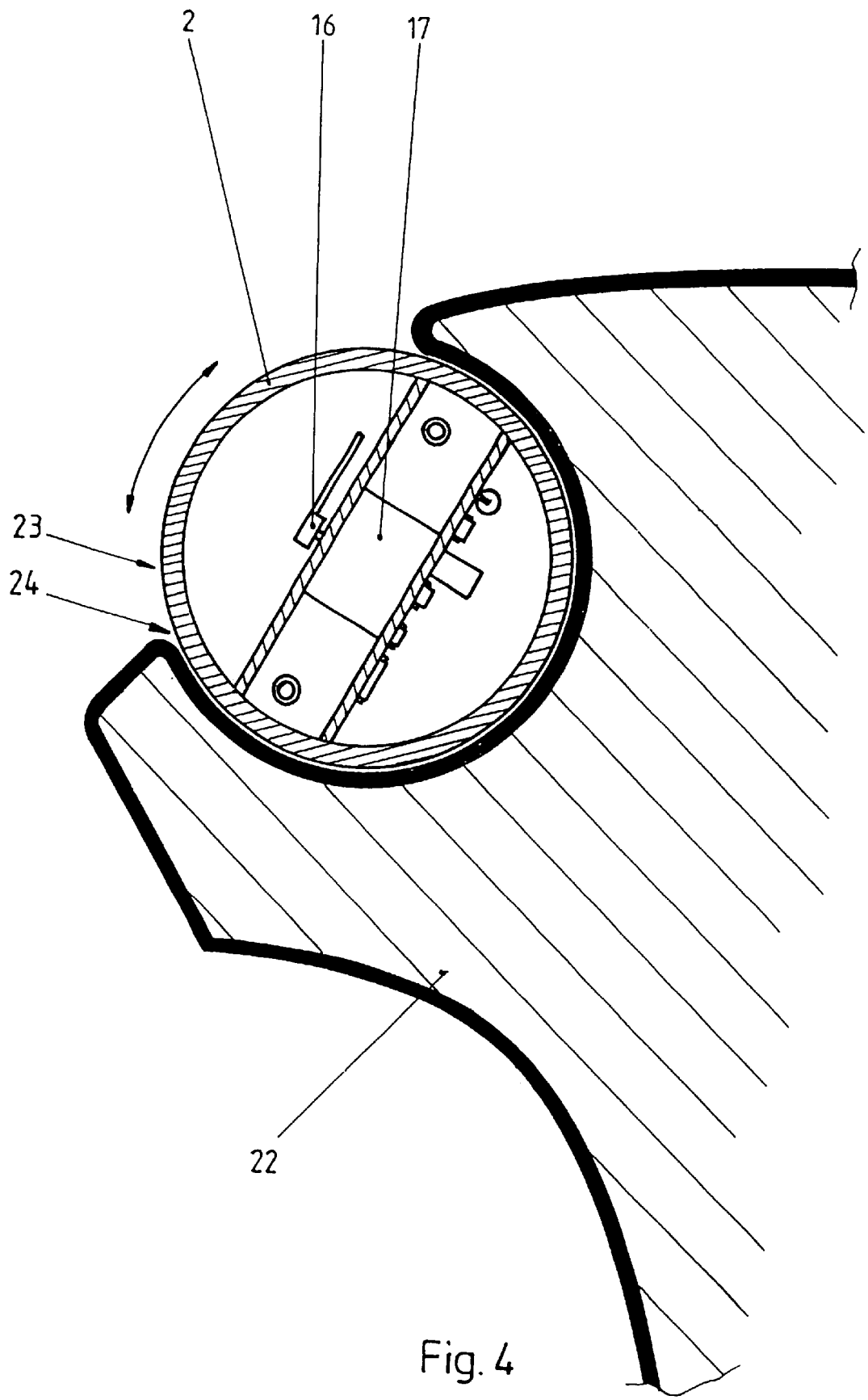
FIG. 4 shows a combination instrument which is installed in a dashboard.

FIG. 4 shows a combination instrument 23 which is set into a dashboard 22. In contrast to the combination instrument shown in FIG. 1, the hollow body 2 is in this case inserted directly into a recess 24 in the dashboard 22 in such a manner that it can rotate, so that there is no need for a bearing bracket. The hollow body 2 may be rotated to any desired angle, so that the pointer tab 16 which can be moved by means of the pointer drive 17 can be read optimally. Furthermore, the hollow body 2 may also be pivoted through 180° with respect to the operating position shown, into a rear at-rest position, with the result that the combination instrument 1 is particularly well protected and, for example, prevents the vehicle or craft from being started up, so as to protect against theft. With this in mind, the hollow body 2 may in particular be produced using the two-component injection-molding process and may be transparent only on the front side.

Figure 5:
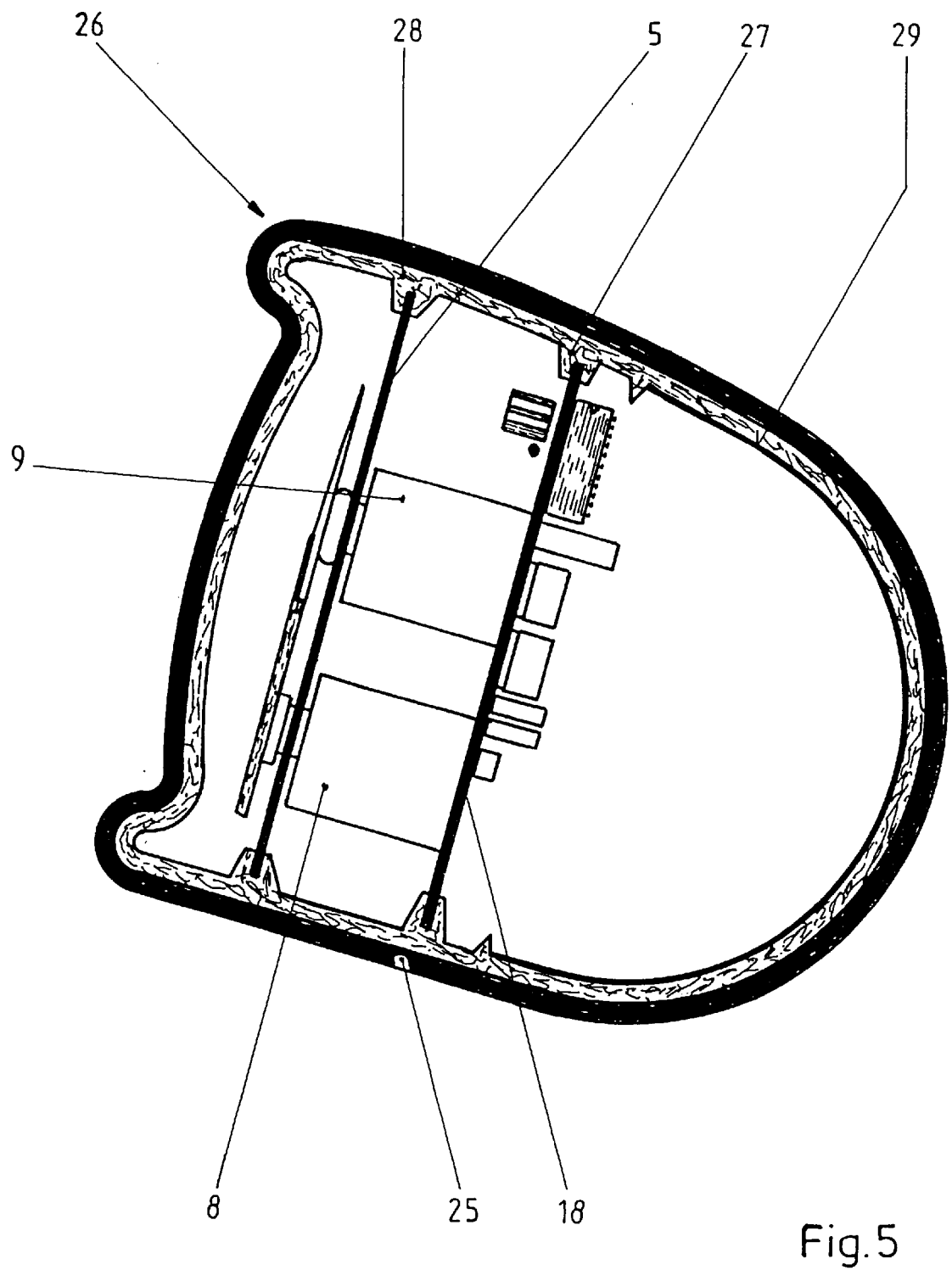
FIG. 5 shows a side view of a further combination instrument, with the side part removed.

FIG. 5 shows a sectional side view of a hollow body of a further combination instrument 26. In this embodiment, the hollow body 25 is modified in cross section, with a fixing means 27, 28 arranged on its inside in order to hold a common circuit board 5 and the rear circuit board 18, respectively. In its rear area, the essentially transparent hollow body 25 is shielded from an observer by means of a nontransparent protective film or foil 29. Other embodiments may also dispense with such a protective film or foil 29, in order to make it possible to view the inner electronic components. That section of the hollow body 25 which faces towards the display instruments 8, 9 may be of any desired and expedient design, for example convex or concave. In addition to transparent sections, the surface of the hollow body 25 may also have opaque coatings or areas with colored or light-diffusing areas.

I claim:

1. A combination instrument, suitable for a watercraft, having an instrument carrier for holding a plurality of display instruments, wherein the instrument carrier has a hollow body which is transparent at least in sections and in its interior accommodates the display instruments in such a way that the displays of the display instruments are visible to an observer through the hollow body; and wherein the hollow body is arranged in a dashboard in such a manner that it can pivot from an operating position, in which the display instruments are visible to an observer, into an at-rest position, in which the display instruments are covered by the dashboard.

2. A combination instrument, suitable for a watercraft, having an instrument carrier for holding a plurality of display instruments, wherein the instrument carrier has a hollow body which is transparent at least in sections and in its interior accommodates the display instruments in such a way that the displays of the display instruments are visible to an observer through the hollow body; and wherein the combination instrument further comprises a cover which can move relative to the hollow body, in order to protect against the incidence of extraneous light and damage.

3. The combination instrument as claimed in claim 2, wherein the cover is displaceable in a guide of the respective side part.

* * * * *